United States Patent Office 3,576,599
Patented Apr. 27, 1971

3,576,599
CONTINUOUS PROCESS FOR THE PRODUCTION OF CALCIUM SULPHATE ALPHA-HEMIHYDRATE FROM GYPSUM
Alexander Beveridge Anderson and Martin S. Bloom, Norton-on-Tees, England, assignors to Imperial Chemical Industries Limited, London, England
Filed Jan. 12, 1968, Ser. No. 697,530
Claims priority, application Great Britain, Jan. 17, 1967, 2,475/67
Int. Cl. C01f *11/46*
U.S. Cl. 23—122          4 Claims

ABSTRACT OF THE DISCLOSURE

In a continuous process for the production of calcium sulphate alpha-hemihydrate from gypsum, the rate of conversion to alpha-hemihydrate and the rheology of the product are controlled by controlling the temperature and flow dynamics of the injected steam.

---

Figure 1:
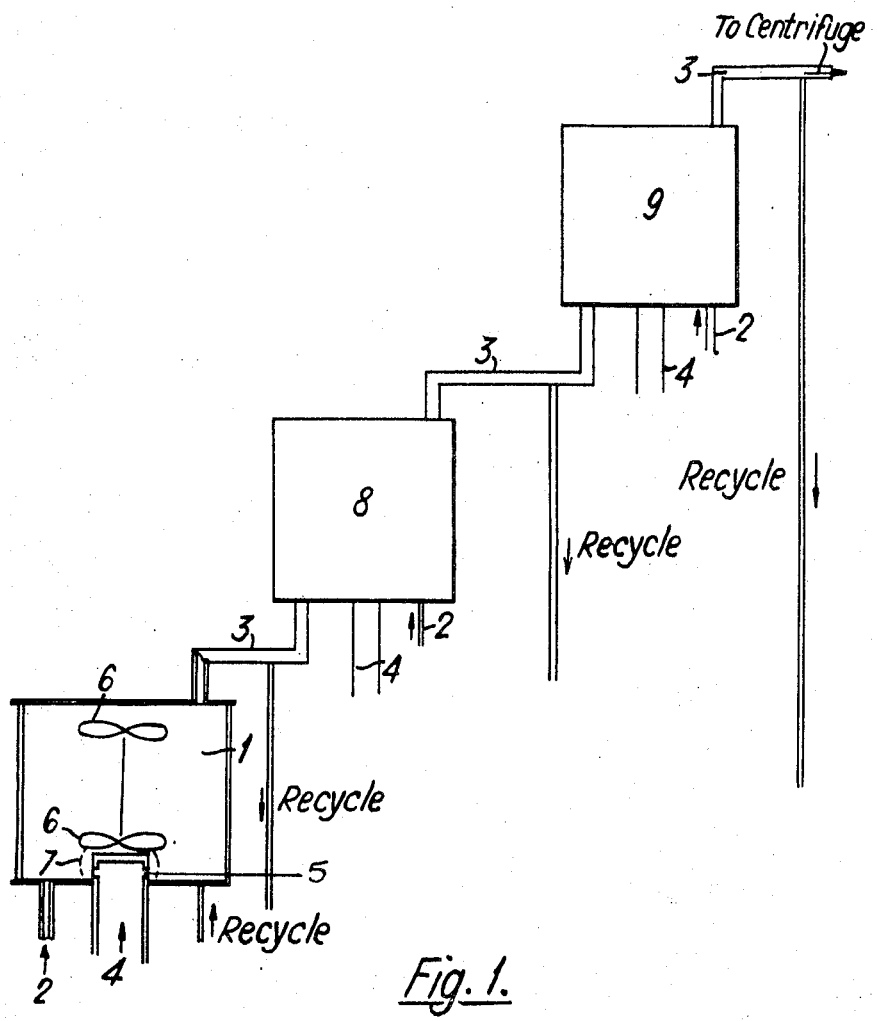

This invention relates to a continuous process for the production of calcium sulphate alpha-hemihydrate from gypsum (both natural gypsum and synthetic by-product gypsum as recovered, for example, in the manufacture of phosphoric acid by the acidulation of phosphate rock) and constitutes an improvement in or modifications of the invention described in our U.S. application Ser. No. 414,244 filed Nov. 27, 1964, now abandoned.

In our said co-pending British application No. 1,051,849 corresponding to U.S. application Ser. No. 414,244 filed Nov. 27, 1964, we have described and claimed a process for the continuous production of calcium sulphate alpha-hemihydrate from gypsum, which comprises the steps of continuously passing a slurry of gypsum and water at super-atmospheric pressure into and through a reactor having an inlet and an outlet, heating the slurry by the injection of high-pressure steam, after it is admitted into the reactor, to a temperature of at least 130° C., agitating the heated gypsum slurry in the reactor, and continuously withdrawing calcium sulphate alpha-hemihydrate from the outlet of the reactor without reducing the pressure therein. Said superatmospheric pressure (e.g. 4 to 10 ats.) is considerably in excess of that required to maintain the water in the liquid phase within the reactor.

The injection of high-pressure steam serves to maintain the mean or bulk temperature of the slurry in the reactor at a level which is not only conducive to rapid conversion reaction, but which is also consistent with economical use and recovery of heat from the system in the form of flash-off steam. In addition, however, we have found that it causes the formation, around the steam injection point or points, of a hot zone or hot interfacial layer between the injected steam and the slurry, which hot zone is at a higher temperature than the said mean or bulk temperature of the slurry and which affects the conversion reaction rate. This hot zone causes the gypsum crystals in the slurry to be converted to hemihydrate crystals more rapidly than elsewhere in the reactor, and these hemihydrate crystals act as nuclei or seed crystals for the reaction, thereby speeding up the overall conversion rate in the reactor. The hot zone therefore acts as a "nucleation" zone, and we have found that by controlling the extent (i.e. the surface area and shape) and the temperature of this zone, it is possible to control the formation of nuclei hemihydrate crystals and, therefore, the overall conversion rate in the reactor while maintaining the mean or bulk temperature in the reactor substantially constant. Where there are several steam injection points, there will be several hot zones which may remain separate from each other or which may overlap to form an enlarged hot zone.

The temperature and extent of the hot, or nucleation, zone are governed by (a) the temperature, volume and velocity of the injected steam, (b) the degree of agitation in the reactor. Where (b) and (c) are substantially constant, the temperature and extent of the hot, or nucleation, zone can therefore be controlled in a number of ways, for example:

(a) by varying the temperature of the injected steam, an increase in which will increase the temperature and/or extent of the hot zone;
(b) by varying the steam injection pressure gradient relative to the reactor pressure, an increase in which gradient will increase the extent and/or temperature of the hot zone;
(c) by varying the position, size, shape and number of the steam injection ports, thereby varying the position, shape and surface area of the hot zone or zones and, hence, the number of nuclei hemihydrate crystals within the reactor and their distribution therein.

Controlling the extent and temperature of the hot, or nucleation, zone not only makes it possible to control the overall conversion rate in the reactor, but also makes it possible, for a given conversion rate, to operate at a lower mean or bulk temperature than hitherto. If the hot zone is such that it effects little nucleation, then the mean or bulk temperature in the reactor must be comparatively high in order to achieve the desired rate of conversion; if, on the other hand, the hot zone is such that it effects considerable nucleation, then the mean or bulk temperature in the reactor may be comparatively low and the same rate of conversion can still be achieved. The use of a comparatively low mean or bulk temperature in the reactor is an obvious economy, and furthermore permits the efficient recovery of heat by means of the direct application of flash-off steam to pre-heat the feed slurry of gypsum and water.

The present invention accordingly provides a process for the continuous production of calcium sulphate alpha-hemihydrate from gypsum, which comprises the steps of continuously passing a slurry of gypsum and water at superatmospheric pressure into and through a reactor having an inlet and an outlet, maintaining the slurry in the reactor, by the injection thereinto of high pressure steam through one or more steam injection ports, at a mean or bulk temperature sufficient to cause conversion of the gypsum to calcium sulphate alpha-hemihydrate, said superatmospheric pressure being in excess of that required to maintain the water in the liquid phase at said mean or bulk temperature within the reactor, controlling said conversion by controlling the temperature and/or the flow dynamics of the injected steam so as to provide, adjacent said injection port or ports, one or more hot zones of controlled extent and temperature where nuclei alpha-hemihydrate crystals are formed to a controlled extent, agitating the slurry in the reactor, and continuously withdrawing a slurry of calcium sulphate alpha-hemihydrate and water from the outlet of the reactor without reducing the pressure therein.

The mean or bulk temperature in the reactor should be at least 100° C., preferably at least 130° C., and for economic reasons is preferably not more than about 170° C. As the reaction temperature is elevated, so it becomes economically more desirable to recover heat from the system. A mean or bulk temperature of about 150° C. is generally suitable where it is desired to recover steam from the system and to use the recovered steam fully to pre-heat the gypsum slurry at atmospheric pressure prior to introducing it into the reactor. The higher the superatmospheric pressure to which the slurry is subjected, the greater can be the pressure and temperature of the injected steam. In the experiments described herein, it was convenient to maintain the slurry at a pressure of about twice that required to maintain the water in the liquid phase in the reactor.

Over-active agitation of the slurry in the reactor may cause the hot zone to be diminished in size and the degree of agitation is preferably, therefore, controlled to minimise this effect.

FIG. 1 of the accompanying drawings illustrates diagrammatically a suitable apparatus for carrying the invention into practice and, in its simplest form, comprises a reactor 1, such as an autoclave, provided with an inlet 2 for gypsum slurry, an outlet 3 for hemihydrate slurry, steam injection means 4 having a plurality of steam injection ports 5, and means, such as one or more stirrers 6, for agitating the slurry in the reactor in a controlled manner. In a preferred embodiment the apparatus is similar to that described and claimed in our said co-pending British application No. 1,051,849 corresponding to U.S. application Ser. No. 414,244 filed Nov. 27, 1964.

A slurry of gypsum and water, which may be preheated if desired, is introduced into the reactor 1 continuously, under superatmospheric pressure, through the inlet 2. By way of example only, the slurry in the reactor may conveniently have a mean or bulk temperature of 150° C., and be under a pressure of 90 to 110 p.s.i.g., which is in excess of the autogenic pressure (approximately 55 p.s.i.g.) corresponding to a mean temperature of 150° C, and the preheated slurry is therefore introduced into, and agitated in, the reactor under such excess pressure. Sufficient high pressure steam (for example, under a pressure of 100 to 250 p.s.i.g.) is injected continuously into the reactor through steam injection ports 5, to maintain the mean or bulk temperature at about 150° C. Such injection of steam causes the formation, around the steam injection ports 5, of a hot zone 7 which is at a temperatrue higher than the mean or bulk temperature, e.g. some 10° C. to 15° C. higher. As previously explained, this hot zone is a nucleation zone where nuclei crystals of hemihydrate are formed more rapidly than elsewhere in the reactor, and the more such nuclei are formed, the faster the reaction rate until the conversion is so high that gypsum-dissolution is the limiting factor.

EXAMPLE I

Figure 2:
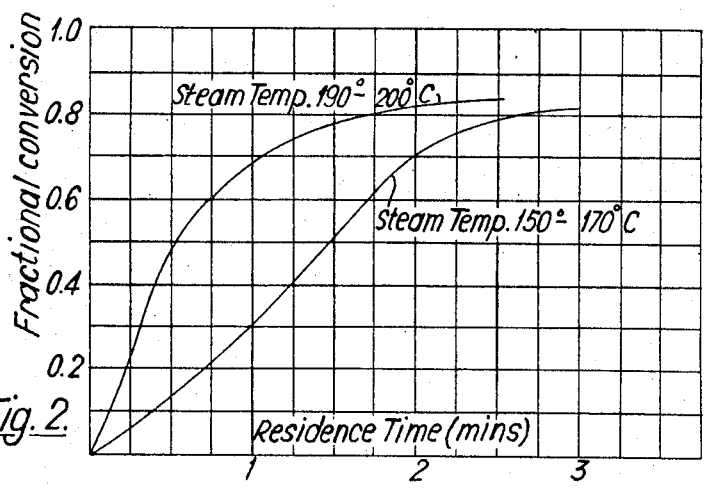

In a first pair of tests, a gypsum slurry was formed from by-product gypsum recovered from the acidulation of Nauru phosphate rock (to which some bauxite had been added) for the production of phosphoric acid therefrom; the gypsum: water ratio of the slurry was 40:60. The slurry was divided into two portions which were tested, consecutively, in an apparatus similar to that described and claimed in our said co-pending British application No. 1,051,849 corresponding to U.S. application Ser. No. 414,244 filed Nov. 27, 1964 and in which the reactor was subdivided by partitions into 5 adjacent compartments. (The experimental data and results given hereafter all refer to conditions and conversion rates obtaining and obtained in the first of these 5 compartments.) In both tests, the mean or bulk temperature and the pressure in the reactor were about 150° C. and 90 p.s.i.g. respectively. In the first test, the steam was injected at a temperature in the range 150° C. to 170° C. through a single quarter-inch injection pipe. In the second test, the steam was injected at a temperature in the range 190° C. to 200° C. through twenty circular ports of quarter-inch diameter arranged circumferentially around a main injection pipe of about 3″ diameter. For each of these tests, the fractional conversion to alpha-hemihydrate in the first compartment of the reactor has been plotted (in FIG. 2) against the slurry's residence time therein and it will be seen that, in the second test, 60% to 80% conversion to hemihydrate was achieved in the first compartment of the reactor almost twice as fast as in the first test.

EXAMPLE II

In a further series of tests, a gypsum slurry was formed as in Example I (with the difference that it contained no bauxite), and processed at various flow-rates under the conditions A, B, C and D hereunder. In each test, the mean or bulk temperature in the autoclave was 150° C. and the steam was injected through circular ports of quarter-inch diameter. However, conditions varied, as follows, in each of the four tests:

(A) Only two injection ports were used, so that their total area was 0.098 sq. in.
(B) Four injection ports were used, with a total area of 0.196 sq. in.
(C) Ten injection ports were used with a total area of 0.49 sq. in.
(D) Twenty injection ports were used with a total area of 0.98 sq. in.

In the case of test A, the small steam-injection area gave rise to a high pressure drop across the injector and, consequently, high pressure and temperature within it, and in this particular case the steam temperature was approx: 192° C. In the case of tests B, C and D, the larger steam-injection area caused a smaller pressure drop across the injector and, consequently, lower pressures and temperatures within it, and in these three cases the steam temperature varied between 186° C. and 182° C.

Figure 3:
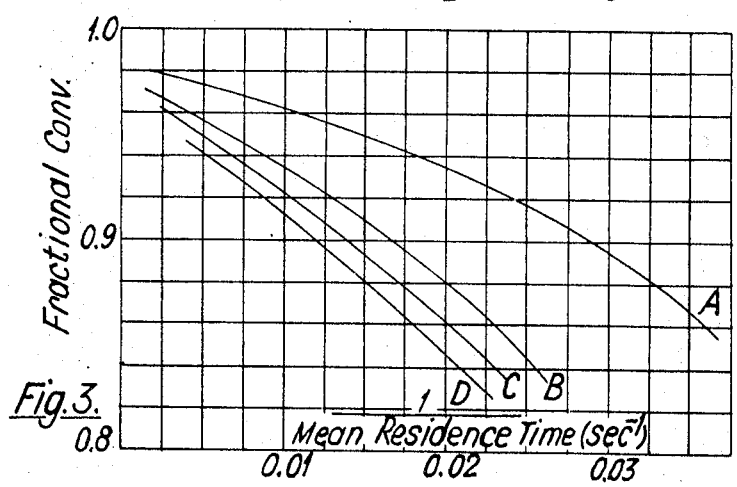

In all four cases, the degree of conversion obtained in the first compartment of the reactor was measured over the same range of slurry flow-rates therethrough, and the results were plotted in the curves shown in FIG. 3. For a given residence time in the first compartment of the reactor, the detected hot zone formed in the test A was a greater size and higher temperature than those formed in tests B, C and D and therefore the degree of conversion in the test A was greater. This was particularly noticeable at short residence times. For example, where $$\frac{1}{\text{mean residence time}} = 0.02 \text{ sec.}^{-1}$$

a conversion of 93.5% was obtained in test A (two injection ports with a total area of 0.098 sq. in.); on the other hand, in test D, where twenty injection ports were used with a total area of 0.98 sq. in., where the steam velocity was accordingly 10 times lower, where the steam temperature was accordingly about 7° C. to 10° C. lower, and where the hot zone was accordingly less extensive, the conversion obtained fell to 84.5%.

Figure 4:
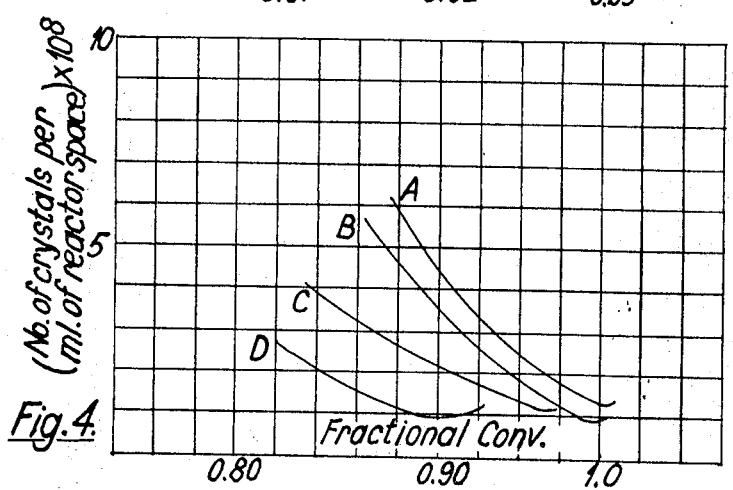

In the four tests A, B, C and D, the number of alpha-hemihydrate crystals present in the first compartment of the reactor were counted at various conversion levels, and the results were plotted in the curves shown in FIG. 4. It will be seen therefrom that, for a given conversion level, say 90%, more crystals of alpha-hemihydrate were produced in the test A than in the tests B, C and D; in other words, the more extensive the hot zone, the greater the number of alpha-hemihydrate nuclei produced. This, in itself, provides a method of controlling the crystal size and size-distribution and, hence, the rheology of the alpha-hemihydrate product. (It will be observed that, in FIG. 4, each of the curves tends to turn upwards as complete conversion is approached, thereby indicating an increase in the number of nuclei; this increase is, in fact, due to attrition.)

From the foregoing, it will therefore be appreciated that the rate of conversion and the rheology of the alpha-hemihydrate product can be controlled by controlling the temperature and/or extent of the hot, or nucleation, zone or zones, which can in turn be controlled by controlling the temperature and/or the flow dynamics of the injected steam and/or the method and/or degree of agitation within the reactor. The flow dynamics of the injected steam which depend, inter alia, on its volume and velocity (which, as shown above, may also affect its temperature) can be controlled by controlling, for example, the pressure of the slurry in the reactor, the steam injection pressure and/or the "geometry" (i.e. the number, position, size and/or shape) of the steam injection ports.

Reverting to the arrangement illustrated in FIG. 1 of the drawings, hemihydrate slurry is continuously withdrawn from the reactor 1 through the outlet 3 without reducing the pressure in the reactor and, as described in our said co-pending British application No. 1,051,849 corresponding to U.S. application Ser. No. 414,244 filed Nov. 27, 1964, may be led to a centrifuge and, subsequently, to casting plant, for example to a block or panel moulding plant or plasterboard plant. However, nucleation control by the method of the present invention also affords a method of controlling the crystal size and shape, and the size- and shape-distribution, and therefore of "tailormaking" the rheology of the hemihydrate, and accordingly the hemihydrate slurry, before being discharged to the centrifuge, may be passed through any number of additional reactors (e.g. 8, 9) in any order, with or without recycle to preceding reactors, and with or without fresh gypsum slurry feed, in any desired proportion, to such additional reactors. Thus the hemihydrate slurry from reactor 1 may be fed in turn to reactors 8 and 9, or it may be fed directly to reactor 9; the hemihydrate slurry from reactor 8 may be recycled to reactor 1; and the hemihydrate slurry from reactor 9 may be withdrawn directly to a centrifuge, or it may be recycled to reactor 8 or to reactor 1. The nucleation conditions (as described hereinabove for reactor 1) may be separately adjustable in each of the reactors 8 and 9. Nucleation control by the method according to the present invention makes it possible to control, at least in part, the crystal size and crystal shape, and the size- and shape-distribution of the alpha-hemihydrate produced in reactor 1; this control is strengthened by the further control and selection of the nucleation conditions in the subsequent reactors 8 and 9 with the result that the rheology of the alpha-hemihydrate in the slurry eventually discharged to the centrifuge can, to a certain extent, be predetermined and prselected, particularly when the method of the invention is used in conjunction with conventional methods of crystal habit control.

What is claimed is:

1. A process for the continuous production of calcium sulphate alpha-hemihydrate from gypsum, which comprises the steps of continuously passing a slurry of gypsum and water at super-atmospheric pressure between about 4 and 10 atmospheres into and through a reactor having an inlet and an outlet, maintaining the slurry in the reactor, by the injection thereinto of steam at a pressure above the reactor pressure through at least one steam injection port, at a mean temperature between 130° C. and 170° C. and sufficient to cause conversion of the gypsum to calcium sulphate alpha-hemihydrate, said superatmospheric pressure being in excess of that required to maintain the water in the liquid phase at said mean temperature within the reactor, controlling said conversion by controlling the steam injection so as to provide, adjacent at least one of said injection ports, at least one hot zone of controlled extent and of controlled temperature which is at least 10° C. hotter than the mean slurry temperature and wherein nuclei alpha-hemihydrate crystals are formed to a controlled extent, agitating the slurry in the reactor, and continuously withdrawing a slurry of calcium sulphate alpha-hemihydrate and water from the outlet of the reactor without reducing the pressure therein.

2. A process as claimed in claim 1 wherein said mean temperature within the reactor is about 150° C.

3. A process as claimed in claim 1, wherein said superatmospheric pressure is approximately twice that required to maintain the water in the liquid phase at said mean temperature within the reactor.

4. A process as in claim 1 wherein the injection of steam forms a hot zone which is about 15° C. hotter than the mean slurry temperature.

References Cited
UNITED STATES PATENTS 3,081,152   3/1963   Johnson _____ 23—122

OSCAR R. VERTIZ, Primary Examiner

G. A. HELLER, Assistant Examiner